United States Patent [19]
Buckley et al.

[11] Patent Number: 4,938,082
[45] Date of Patent: Jul. 3, 1990

[54] INSPECTION SYSTEM AND METHOD

[76] Inventors: B. Shawn Buckley, 7067 Via Blanca, San Jose, Calif. 95139; Keith J. DelleDonne, 17 Pleasant Ave., Apt. 4, Los Gatos, Calif. 95032; Kendall A. King, 1929 The Alameda, San Jose, Calif. 95126

[21] Appl. No.: 248,434

[22] Filed: Sep. 22, 1988

[51] Int. Cl.⁵ .............................................. G01B 21/00
[52] U.S. Cl. .................................. 73/865.8; 198/460; 414/223
[58] Field of Search ............... 73/865.8; 198/459, 460; 414/222, 223

[56] References Cited

U.S. PATENT DOCUMENTS

| | | | |
|---|---|---|---|
| 3,900,107 | 8/1975 | Hoppmann | 198/803 X |
| 3,908,860 | 9/1975 | Schultz | 198/392 X |
| 4,200,921 | 4/1980 | Buckley | 307/117 X |
| 4,287,769 | 9/1981 | Buckley | 73/628 X |
| 4,511,046 | 4/1985 | Walsh et al. | 209/699 X |
| 4,557,386 | 12/1985 | Buckley et al. | 209/590 X |
| 4,576,286 | 3/1986 | Buckley et al. | 209/590 X |

Primary Examiner—Tom Noland
Attorney, Agent, or Firm—Burns, Doane, Swecker & Mathis

[57] ABSTRACT

An automated inspection system for identifying geometric or electromagnetic characteristics of parts includes a rotary feeder that arranges bulk parts in a single-file stream on its rim. A first deflector mechanism is connected to the feeder for providing predetermined minimum spacing between the parts on the rim. The first deflector mechanism includes, for example, a detector for detecting parts travelling on the rim, a gate for diverting parts from the rim when the spacing between consecutive parts is less than the predetermined minimum spacing, and an actuator responsive to signals from the detector to selectively pivot the gate. Further, the inspection system includes an inspection device for inspecting parts fed by the feeder means past the deflector mechanism.

16 Claims, 3 Drawing Sheets

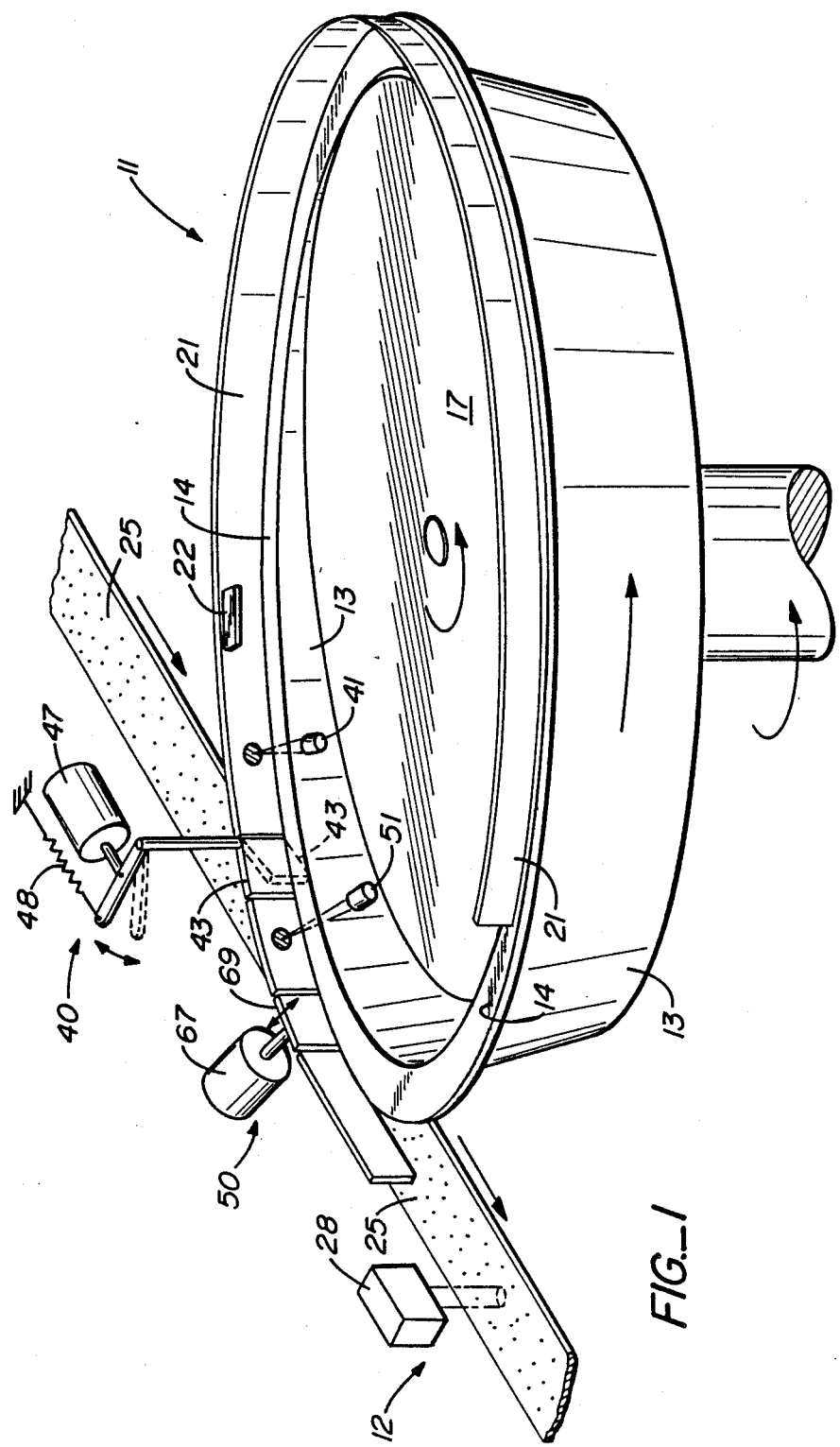
FIG._1

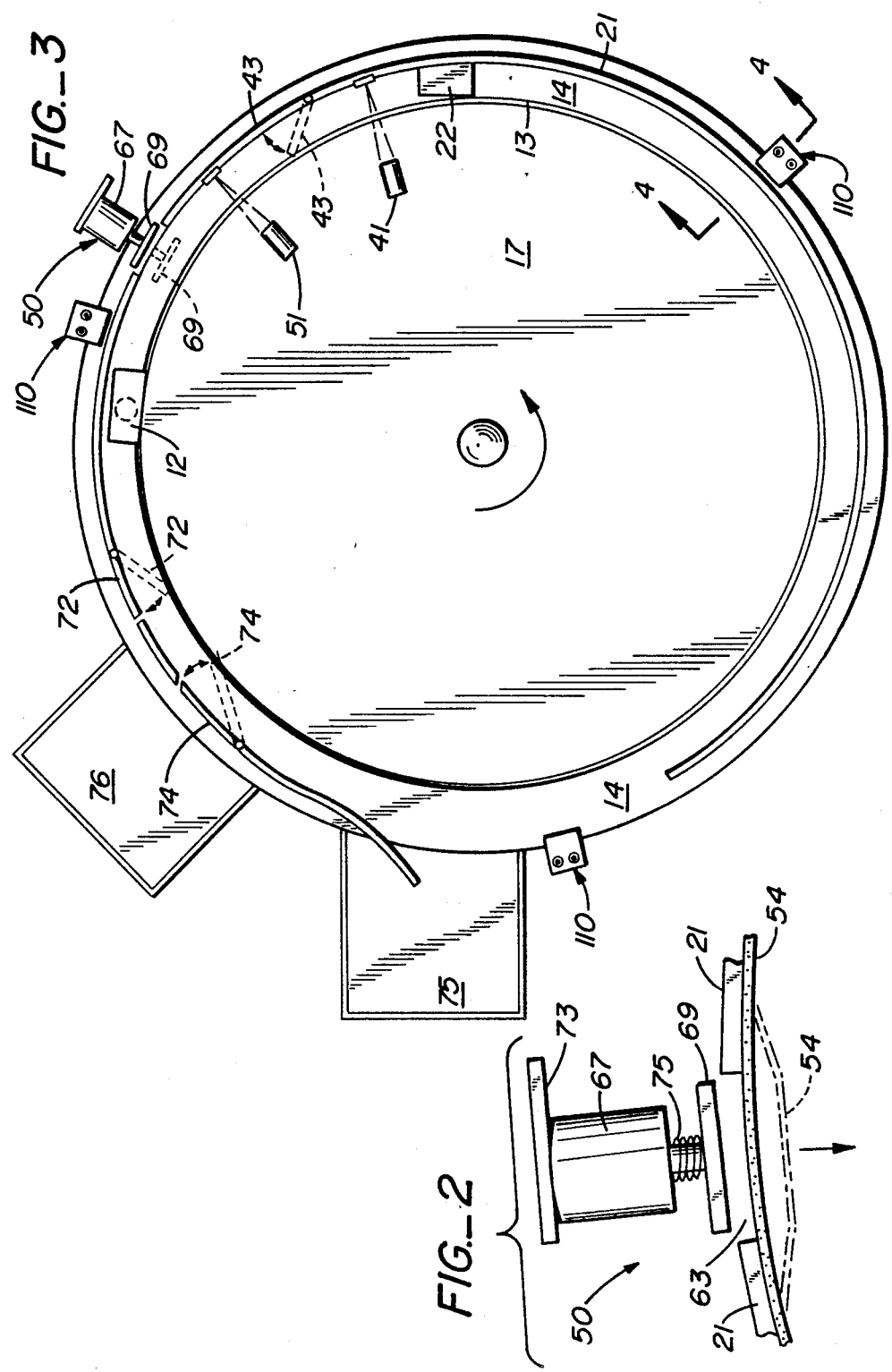

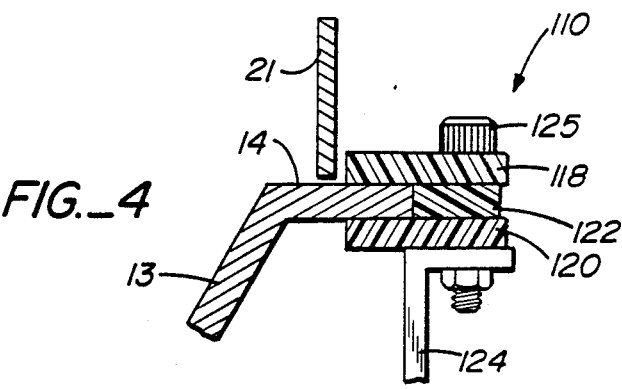
FIG._4
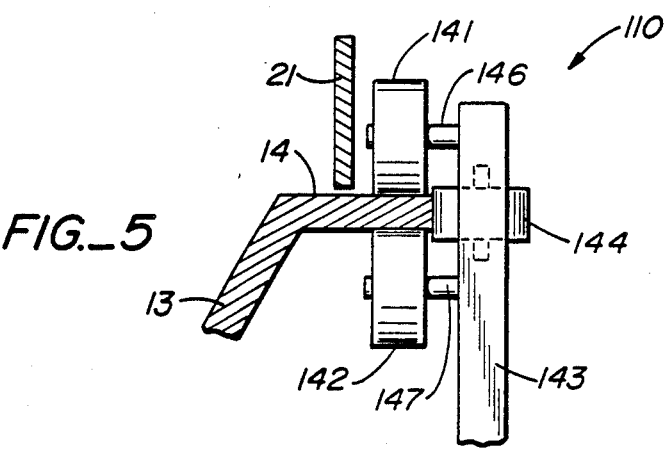
FIG._5
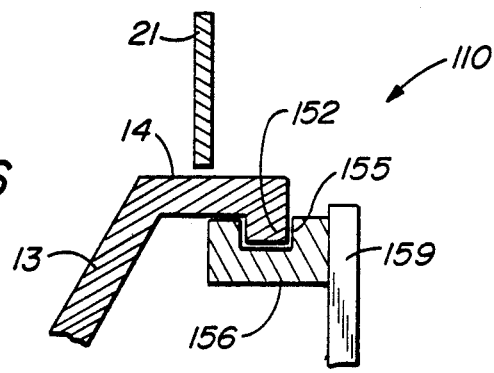
FIG._6

INSPECTION SYSTEM AND METHOD

BACKGROUND OF THE INVENTION

1. Field of the Invention

The present invention generally relates to automated inspection systems for identifying and sorting objects according to their geometrical and/or electromagnetic characteristics.

2. State of Art

It is well known that automated inspection systems can recognize geometric characteristics of parts based upon their interaction with fields of acoustic waves. In this regard, attention is drawn to U.S. Pat. Nos. 4,095,475; 4,200,921; 4,287,769; 4,557,386; and 4,576,286. Also, it is known that automated inspection systems can recognize electromagnetic characteristics of parts by employing electromagnetic fields which interact with the parts to provide "electromagnetic signatures".

In such inspection systems, two types of errors may arise: false acceptances and false rejections. False acceptance errors arise when parts are accepted which are defective or otherwise do not conform to predetermined standards. For example, in an automated inspection system for inspecting bolts, a false acceptance error would arise if the system accepted a bolt with a damaged head. Also, a false acceptance error would arise if a screw, although nondefective, were to pass an inspection which was intended to pass only bolts. False rejection errors would arise if the system rejected parts which were not defective but, in fact, conformed to predetermined standards. When automated inspection systems are used to sort parts, false rejection and false acceptance errors result in mixing different kinds of parts.

In automated inspection systems which recognize geometrical or electromagnetic characteristics of parts by their interactions with fields of waves, false rejection and false acceptance error often relate to the state in which parts are presented for inspection. For instance, if parts are presented for inspection in unusual positions, the probability increases that such systems will make inspection errors. Also, if parts are submitted for inspection while vibrating or wobbling, the probability increases that such systems will make inspection errors.

SUMMARY OF THE INVENTION

Generally speaking, the present inspection provides an automated system for inspecting geometrical and/or electromagnetic characteristics of parts. In the system, parts are first arranged into a single file stream and then parts are diverted from the stream to provide a predetermined minimum spacing as the parts pass, one-by-one, through an inspection station where the geometric and/or electromagnetic characteristics of the parts are identified.

BRIEF DESCRIPTION OF THE DRAWINGS

In the appended drawings:

FIG. 1 is a pictorial view of an inspection system according to the present invention;

FIG. 2 is an enlarged detail view of a portion of the system of FIG. 1;

FIG. 3 is a plan view of an alternate embodiment of an inspection system according to the present invention;

FIG. 4 is a cross-sectional detail, enlarged for purposes of clarity, of one embodiment of a stabilizing mechanism for use in the system of FIG. 3;

FIG. 5 is a cross-sectional detail, enlarged for purposes of clarity, of another embodiment of a stabilizing mechanism for use in the system of FIG. 3; and FIG. 6 is a cross-sectional detail, again enlarged for purposes of clarity, of yet another embodiment of a stabilizing mechanism for use in the system of FIG. 3.

DETAILED DESCRIPTION OF THE PREFERRED EMBODIMENT

FIG. 1 shows an inspection system including a feeder device 11 and an inspection station 12. The purpose of feeder device 11 is to separate parts into a single-file stream with a predetermined minimum spacing and with all of the parts in the stream being in generally stable positions. The purpose of inspection station 12 is to identify any parts in the stream which do not have acceptable geometric characteristics (i.e., shapes and sizes).

Feeder device 11 in FIG. 1 can be generally described as a modified rotary feeder. As such, the feeder device includes a circular bowl-shaped member 13 having a generally horizontal rim 14. Further, feeder device 11 includes a disc-shaped floor member 17 which is mounted within bowl-shaped member 13 at a fixed angle from the horizontal so that, at its upwardmost point, the floor member is tangent to the edge of rim 14. Bowl-shaped member 13 and floor member 17 are centrally connected to be rotatably driven about two axes: a generally vertical axis for bowl-shaped member 13 and a slightly inclined axis for floor member 17. Further, feeder device 11 includes a fence-like vertical wall 21 which is stationarily mounted along the outer periphery of rim 14. A wiper member 22 is mounted to project from wall 21 at a predetermined elevation above rim 14.

As also shown in FIG. 1, a transport device 25 is arranged to extend from rim 14 to inspection station 12. In practice, transport device 25 is normally either a moving belt or a stationary chute.

As further shown in FIG. 1, inspection station 12 includes one or more transducers 28 that transmit and detect signals which interact with parts presented for inspection. The transducers 28 preferably are of the acoustic type but, alternatively, can be of the type which detect low-frequency electromagnetic waves, microwaves, or light. As yet another alternate, transducers 28 can be devices which sense capacitance changes or eddy currents.

In operation of feeder device 11 of FIG. 1, parts are placed in bulk on floor member 17. Then, when bowl-shaped member 13 and floor member 17 are rotated, the parts are carried to a position where centripetal force urges them onto rim 14. In practice, wall 21 is arranged sufficiently close to the radially inward edge of rim 14 that two parts cannot sit side-by-side on the rim; also, wiper member 22 prevents parts from sitting one atop another. Therefore, any parts carried by rim 14 are almost immediately arranged in a single file stream. As rim 14 rotates in the horizontal plane, parts slide against wall 21 and are urged into generally stable equilibrium positions by the centripetal force of the rim. Also, as parts travel along rim 14, they pass two deflection mechanisms, described below, for providing minimum spacing between the parts. Finally, at an appropriate location, the parts on rim 14 move by centrifugal force onto transport device 25 which carries them to inspection station 12.

FIG. 1 shows one example of a first deflection device 40 for assisting in establishing a predetermined minimum spacing between parts travelling on rim 14. More particularly, the illustrated deflection device 40 comprises a first photo-electric detector 41 which detects parts conveyed on rim 14 and a first pivotable gate 43 connected to a solenoid actuator 47 for selectively deflecting parts from rim 14 in response to signals from detector 41. In its deflecting position, shown by dashed lines in FIG. 1, gate 43 projects onto rim 14 to deflect parts onto floor member 17. In its non-deflecting position, shown by solid lines in FIG. 1, gate 43 is disposed to allow passage of parts on rim 14. In the illustrated embodiment, gate 43 is biased to the deflecting position by a compression spring 48.

FIGS. 1 and 2 show a second deflection device 50 for deflecting parts from rim 14 if the parts pass gate 43 with a spacing closer than the predetermined minimum spacing In the illustrated embodiment, second deflection device 50 includes a second detector 51 for detecting parts which pass gate 43 on rim 14, a flexing membrane 54 fitted across an aperture 63 formed in wall 21, and a solenoid 67 mounted on bracket 73 outward of wall 21 to operate against membrane 54. More particularly, solenoid 67 has an end member 69 adapted to centrally strike membrane 54 and, thereby, transfer its momentum to any parts in front of the membrane. Also, in the illustrated embodiment, a compression spring 75 is arranged to normally bias end member 69 slightly away from membrane 54.

In operation of first deflection mechanism 40, detector 41 provides an output signal whenever it detects the leading edge of a part approaching gate 43 on rim 14. Upon receiving an initial output signal from detector 41, solenoid 47 operates to pivot gate 43 to the non-deflecting position. Then, solenoid 47 holds gate 43 in the non-deflecting position for a first preselected period of time which is sufficiently long to allow one part to pass the gate. (In practice, the preselected period depends upon the length of the parts being inspected and upon the rotational velocity of rim 14). Upon expiration of the first preselected period, solenoid 47 is deenergized and spring 48 pivots gate 43 to its deflecting position. In the deflecting position, gate 43 deflects parts from rim 14 into bowl-shaped member 13. Gate 43 remains in the deflecting position for a second preselected time period which is sufficiently long to provide at least minimum spacing between parts that pass gate 43. After the second preselected period expires, gate 43 can again be drawn to the non-deflecting position when detector 41 senses the leading edge of an approaching part.

In typical practice, the response time of the first deflection device 40 is about 20 ms±5 ms due to the large rotational inertia of gate 43. Because of the variability of the response time, two consecutive parts occasionally pass gate 43 with less than the predetermined minimum spacing. Upon such an occurrence, second deflection device 50 operates to prevent one or more of the closely spaced parts from reaching inspection station 12.

In operation of second deflection mechanism 50, detector 51 provides an output signal whenever it detects the leading edge of part which has passed gate 43. After expiration of a preselected time period which begins with the output signal from detector 51 and which is sufficiently long to allow the detected part to travel past membrane 54, solenoid 67 is actuated. Upon actuation of solenoid 67, end member 69 strikes flexing membrane 54 with sufficient force that any parts which are in front of the membrane are knocked into bowl-shaped member 13 by transfer of momentum from end member 69 through the membrane 54 to the part. In practice, the response time of solenoid 67 is on the order of several milliseconds, much faster than operation of deflection device 40. As a result of operation of second deflection device 50, parts have at least the predetermined minimum spacing when they are carried single-file on rim 14 to transport device 25 and then to inspection station 12.

Referring now to FIG. 3, an inspection system is shown which is structurally similar to the inspection system of FIG. 1 except that the inspection station 28 is located on rim 14 of feeder device 11, and diverters 72 and 74 are located on rim 14 for control by output signals from the inspection station. In operation, diverter 72 diverts, or recycles, parts into bowl-shaped member 13 in the event that an inspection at station 12 is inconclusive as to whether the parts are acceptable. Diverter 74 pivotably operates to divert parts into a bin 76 in the event an inspection at station 12 indicates that the parts are acceptable. Finally, in the event that an inspection at station 12 indicates parts are defective, centrifugal force carries the parts off rim 14 into a reject bin 78.

Because inspection measurements at station 12 can be as precise as one or two thousands of an inch, vibrations or other unstable movements of rim 14 can cause inspection errors in the system of FIG. 3. For example, inspection errors can arise if a lack of flatness of rim 14 causes substantial changes in the elevation of parts at the time they are presented for inspection at station 12. Also, inspection errors can arise if eccentricity of rim 14 during rotation causes substantial changes in the radial position of parts presented for inspection. To prevent unstable movement of parts at inspection station 12, stabilizing mechanisms 110 are connected to rim 14.

FIG. 4 shows one embodiment of stabilizing mechanism 110. In this embodiment, the stabilizing mechanism comprises a pair of bearing blocks 118 and 120 separated by a radial spacer member 122 and supported by a stationary bracket 124 to engage the upper and lower surfaces, respectively, of rim 14. In this assembly, a bolt 125 connects the two bearing blocks and spacer member 122 to bracket 124. It should be noted that radial spacer 122 is positioned to ride against the radial edge of rim 14 and, hence, to stabilize radial run-out of the rim. That is, radial bearing member 122 assures that rim 14 rotates uniformly in the radial direction. Typically, the bearing blocks and the spacer member are formed of UHMW plastic or a similar material having a low coefficient of sliding friction to allow rim 14 to rotate freely in the horizontal plane.

FIG. 5 shows another embodiment of stabilizing mechanism 110. In this embodiment, the stabilizing mechanism comprises a pair of rollers 141 and 142 which are mounted to a stationary bracket 143 to roll upon the respective upper and lower surfaces of rim 14. This embodiment also includes a roller 144 which rotates against the edge of rim 14. In the assembly, rollers 141–144 are rotatably connected to bracket 143 by axles 146 and 147, respectively, to allow rim 14 to rotate freely in the horizontal plane wihtout run-out.

Another embodiment of a stabilizing mechanism 110 is shown in FIG. 6. In this embodiment, the stabilizing mechanism comprises a circular rail 152 which is fixed near the edge of rim 14 and positioned to ride within a complementarily-shaped slot 155 in a stationary guide track 156. The guide track is arranged to allow rim 14 to rotate freely in the horizontal plane while preventing excessive run-out. Although the illustrated rail 152 is generally rectangular in cross-section, its cross-sectional shape of is a matter of design choice.

Although the present invention has been described with particular reference to the preferred embodiments, the disclosure should not be interpreted as limiting. Various alterations and modifications will no doubt become apparent to those skilled in the art after having read the preceding disclosure. For example, it is clear that various control schemes and sequences can be employed in operating the inspection systems to separate acceptable parts from unacceptable ones. It is intended that the appended claims be interpreted as covering all such alternative embodiments and equivalents as fall within the spirit and scope of the present invention.

What is claimed is:

1. An automated inspection system for identifying characteristics of parts, comprising:
   a rotary feeder means including a bowl-shaped member having a generally horizontal rim and a disc-shaped floor which rotatably carries parts to the rim;
   a stationary wall arranged so that parts can only travel in a single-file stream on the rim;
   a first deflecting means for selectively diverting parts from the rim such that the single-file parts have a predetermined minimum spacing, the first deflecting means including a first detector for detecting parts that are travelling on the rim, a gate for deflecting parts from the rim into the bowl-shaped member, and first actuating means for moving the gate in response to signals from the detector; and
   inspection means for identifying characteristics of parts conveyed on the rim.

2. An inspection system according to claim 1 further including a second deflecting means for selectively diverting parts from the single-file stream when the parts pass the first deflecting means with a spacing less than the predetermined minimum spacing.

3. An inspection system according to claim 2 wherein the second deflecting means include a second detector for detecting parts that travel on the rim past to the first deflecting means, and second diverting means responsive to signals from the second detector for selectively diverting parts from the rim by momentum transfer into the bowl-shaped member when the spacing between consecutive parts is less than the predetermined minimum spacing.

4. An inspection system according to claim 3 wherein the second deflecting means includes a flexing membrane and the second diverting means is arranged to impel parts from the rim by momentum transfer through the membrane.

5. An automated inspection system for identifying characteristics of parts, comprising:
   a rotary feeder means including a bowl-shaped member having a generally horizontal rim, a disc-shaped floor which rotatably carries parts to the rim, and a stationary wall arranged such that parts can travel along the rim only in a single-file stream;
   a first deflecting means for selectively diverting parts from the rim when the spacing between parts in the single-file stream is less than a predetermined minimum spacing;
   a second deflecting means for selectively diverting parts from the single file stream when parts pass the first deflecting means with a spacing less than the predetermined minimum spacing;
   means for stabilizing movement of the rim; and
   inspection means mounted on the rim for identifying characteristics of conveyed parts.

6. A system according to claim 5 wherein the second deflecting means includes a detector for detecting parts that travel past the first deflecting means, a flexing membrane, and a diverting means responsive to signals from the second detector for selectively diverting parts from the rim by momentum transfer through the flexing membrane.

7. An automated inspection system for identifying at least one of geometric and electromagnetic characteristics of parts, comprising:
   rotary feeder means for arranging bulk parts in a single-file stream, the rotary feeder means including a bowl-shaped member, a generally horizontal rim, and a disc-shaped floor arranged at a fixed angle to rotatably carry parts to the rim;
   first deflecting means connected to the feeder means to provide a predetermined minimum spacing between the parts in the single-file stream, the first deflecting means including a gate for selectively diverting parts from the rim when the spacing between consecutive parts is less than the predetermined minimum spacing, a first detector for detecting parts travelling on the rim, and a first actuator means responsive to signals from the first detector to selectively pivot the gate to deflect parts into the bowl-shaped member; and
   inspection means for inspecting parts fed by the feeder means past the deflecting means.

8. An automated inspection system for identifying at least one of geometric and electromagnetic characteristics of parts, comprising;
   a rotary feeder means including a bowl-shaped member having a generally horizontal rim and a disc-shaped floor which rotatably carries parts to the rim;
   a stationary wall arranged so that parts can only travel in a single-file stream on the rim;
   a first deflecting means for selectively diverting parts from the rim such that the single-file parts have a predetermined minimum spacing, the first deflecting means including a first detector for detecting parts, a gate for deflecting parts, and first actuating means for moving the gate in response to signals from the detector; and
   inspection means for identifying at least one of geometric and electromagnetic characteristics of parts conveyed on the rim.

9. An inspection system according to claim 8 further including a second deflecting means for selectively diverting parts from the single-file stream when the parts pass the first deflecting means with a spacing less than the predetermined minimum spacing.

10. An inspection system according to claim 9 wherein the second deflecting means includes a second detector for detecting parts that travel on the rim past to the first deflecting means, and second diverting means responsive to signals from the second detector for selectively diverting parts from the rim by momentum transfer into the bowl-shaped member when the spacing between consecutive parts is less than the predetermined minimum spacing.

11. An inspection system according to claim 10 wherein the second deflecting means includes a flexing membrane and the second diverting means is arranged to impel parts from the rim by momentum transfer through the membrane.

12. An automated inspection system for identifying at least one of geometric and electromagnetic characteristics of parts, comprising:
   a rotary feeder means including a bowl-shaped member having a generally horizontal rim, a floor means which rotatably carries parts to the rim, and a wall means arranged such that parts can travel along the rim only in a single-file stream;
   a first deflecting means for selectively diverting parts from the rim when the spacing between parts in the single-file stream is less than a predetermined minimum spacing;
   bearing means for stabilizing movement of the rim, the bearing means comprising a pair of bearing blocks which are stationarily mounted to bear against the rim; and
   inspection means mounted on the rim for identifying characteristics of conveyed parts.

13. An automated inspection system for identifying at least one of geometric and electromagnetic characteristics of parts, comprising:
   a rotary feeder means including a bowl-shaped member having a generally horizontal rim, a floor means which rotatably carries parts to the rim, and a wall means arranged such that parts can travel along the rim only in a single-file stream;
   a first deflecting means for selectively diverting parts from the rim when the spacing between parts in the single-file stream is less than a predetermined minimum spacing;
   bearing means for stabilizing movement of the rim, the bearing means comprising a pair of rollers which roll on the upper and lower faces of the rim; and
   inspection means mounted on the rim for identifying geometric characteristics of conveyed parts.

14. An automated inspection system for identifying at least one of geometric and electromagnetic characteristics of parts, comprising:
   a rotary feeder means including a bowl-shaped member having a generally horizontal rim, a floor means which rotatably carries parts to the rim, and a wall means arranged such that parts can travel along the rim only in a single-file stream;
   a first deflecting means for selectively diverting parts from the rim when the spacing between parts in the single-file stream is less than a predetermined minimum spacing;
   bearing means for stabilizing movement of the rim, the bearing means comprising a circular rail member fixed to the rim and stationary guide to receive the rail while allowing the rim to rotate freely in the horizontal plane; and
   inspection means mounted on the rim for identifying characteristics of conveyed parts.

15. A method for inspecting bulk parts comprising the steps of:
   feeding bulk parts to a rotary feeder;
   operating the rotary feeder to form a single-file stream of the parts;
   detecting passage of parts in the single-file stream;
   for a predetermined period following passage of each detected part, preventing any parts from immediately following the detected part in the stream and, thereby, forming a single-file stream of individual parts having a predetermined minimum spacing; and
   for parts which are spaced more closely than the predetermined spacing, diverting such parts by striking them with a member which transfers its momentum to the parts by deforming a flexing membrane.

16. A method for inspecting bulk parts comprising the steps of:
   feeding bulk parts to a feeder;
   operating the feeder to form a single-file stream of the parts;
   detecting passage of parts in the single-file stream; and
   for a predetermined period following passage of each detected part, preventing any parts from immediately following the detected part in the stream and, thereby, forming a single-file stream of individual parts having a predetermined minimum spacing, wherein parts which are spaced more closely than the predetermined spacing are diverted by being struck by a member which transfers its momentum to the parts by deforming a flexing membrane.

* * * * *